United States Patent
Storm

(10) Patent No.: US 10,352,007 B2
(45) Date of Patent: Jul. 16, 2019

(54) CLEANING VEHICLE

(71) Applicant: STORM IP B.V., Rotterdam (NL)

(72) Inventor: Jan Storm, Rotterdam (NL)

(73) Assignee: STORM IP B.V., Rotterdam (NL)

( * ) Notice: Subject to any disclaimer, the term of this patent is extended or adjusted under 35 U.S.C. 154(b) by 0 days.

(21) Appl. No.: 15/482,081

(22) Filed: Apr. 7, 2017

(65) Prior Publication Data

US 2017/0292236 A1    Oct. 12, 2017

(30) Foreign Application Priority Data

Apr. 8, 2016  (NL) .................................... 2016576

(51) Int. Cl.
| | |
|---|---|
| *E01H 1/00* | (2006.01) |
| *E01H 1/08* | (2006.01) |
| *B60R 16/033* | (2006.01) |

(52) U.S. Cl.
CPC ........... *E01H 1/005* (2013.01); *B60R 16/033* (2013.01); *E01H 1/001* (2013.01); *E01H 1/0836* (2013.01)

(58) Field of Classification Search
CPC ....... E01H 1/005; E01H 1/001; E01H 1/0836; B60R 16/033
See application file for complete search history.

(56) References Cited

U.S. PATENT DOCUMENTS

| | | | | |
|---|---|---|---|---|
| 9,045,072 | B2* | 6/2015 | Hetcher | .................... B60P 1/60 |
| 9,821,656 | B2* | 11/2017 | Hinde | .................... F04C 18/126 |
| 9,863,135 | B2* | 1/2018 | Wichmann | ................ B08B 3/02 |
| 2005/0155170 | A1* | 7/2005 | Charky | .................... B60K 5/08 |
| | | | | 15/78 |
| 2014/0017018 | A1 | 1/2014 | Blais et al. | |
| 2015/0042156 | A1* | 2/2015 | Murakami | ............ H01M 10/44 |
| | | | | 307/9.1 |
| 2017/0244337 | A1* | 8/2017 | Kitamoto | ................ B60L 11/18 |

FOREIGN PATENT DOCUMENTS

WO    WO-2007087622 A2    8/2007

* cited by examiner

*Primary Examiner* — Dung Van Nguyen
(74) *Attorney, Agent, or Firm* — Perry + Currier Inc.

(57) ABSTRACT

A cleaning vehicle comprises a rolling chassis and a primary power source (13) in the form of a combustion engine which is able and configured to drive the vehicle. A suction installation (30) is provided which has an underpressure chamber (20) and a pump device (31,32,33) coupled thereto. The pump device comprises a primary pump unit (31,32) which draws its input power from the primary power source (13). In addition, the pump device comprises a secondary pump unit (33) which is optionally driven directly by a secondary power source in the form of an electric motor. The secondary power source (33) is supplied independently of the primary power source (13) by an electrical power supply.

15 Claims, 1 Drawing Sheet

CLEANING VEHICLE

Figure 1:
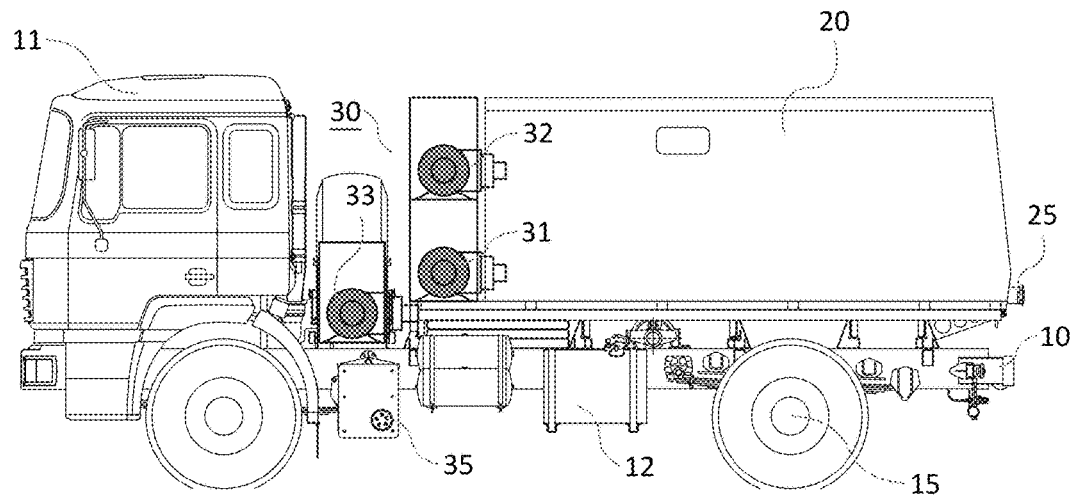

The present invention relates to a cleaning vehicle comprising a rolling chassis and comprising a primary power source which is able and configured to drive the vehicle, which primary power source comprises a combustion engine, wherein a suction installation is provided at least partially fixed to the chassis with an underpressure chamber and a pump device which is coupled thereto and able and configured to create and maintain an underpressure in the underpressure chamber, and wherein the pump device comprises at least one primary pump unit which draws its input power from the primary power source.

Such a vehicle can be utilized to clean installations and sites on which a loose layer of solid or liquid contamination is present. By means of the suction conduit and the underpressure in the underpressure chamber this layer can be suctioned up and collected in the underpressure chamber. The suction installation normally comprises for this purpose a dirt and moisture separator upstream of the pump unit so that the suctioned-up contamination remains in the underpressure chamber and does not disrupt the operation of the pump. At the end of the operation or when a maximum degree of filling thereof has been reached the underpressure chamber is emptied at a collection site or into a separate transport vehicle. The cleaning vehicle has as primary power source a combustion engine, normally a diesel engine, which provides not only for driving of the vehicle itself but also for driving of the suction installation. A suction installation of a conventional cleaning vehicle typically draws a maximum power in the order of 100 kW from the primary power source.

Particular attention must be paid to the cleaning of installations and spaces with flammable or potentially explosive mixtures and substances. For safety purposes such operations are subject to strict safety regulations, which in Europe are laid down in the ATEX directive. ATEX is an abbreviation of the French term ATmosphères EXplosibles and is used as synonym for two European directives in the field of explosion hazard under atmospheric conditions. As of 1 Jul. 2003 organizations in the EU where there is explosion hazard must comply with the ATEX 137 directive. Another directive is the ATEX 95 directive. This directive applies especially to equipment used at locations where explosion hazard generally occurs.

An explosive atmosphere can occur due to the presence of a flammable gas, vapour, mist or dust. If enough hereof is present it can, when mixed with the ambient air (oxygen) and an ignition source, result in an explosion. An explosion can primarily be prevented by ensuring that an explosive atmosphere cannot occur by removing or excluding all flammable substances and/or oxygen. In some situations the presence of flammable substances cannot be avoided and, because people are often at work in workplace environments, it is not usually practical to remove oxygen. This forms a substantial limitation to the utilization of a conventional cleaning vehicle. This is because the combustion engine thereof forms an ignition source, whereby it is not possible to operate safely in ATEX zones with a conventional cleaning vehicle. An example here is for instance cleaning in or at chemical plants and storage depots.

The present invention has for its object, among others, to provide a cleaning vehicle with which it is also possible to work safely in ATEX zones.

In order to achieve the stated object a cleaning vehicle of the type described in the preamble has the feature according to the invention that, in addition to the primary pump unit, the pump device comprises at least a secondary pump unit which is optionally driven directly by a secondary power source, that the secondary power source comprises at least one electric motor and that the secondary power source is supplied independently of the primary power source by an electrical power supply. The invention is based here on the insight that the danger of explosions in an ATEX zone can be obviated, or at least reduced, by eliminating sources of ignition. Because the cleaning vehicle according to the invention has a secondary power source supplied with electricity independently of the combustion engine, it is possible to operate safely in for instance an ATEX zone by means of the secondary pump unit alone. This can be given a sufficiently powerful form to suction up and remove for instance a slurry or other sodden contaminated layer left in a storage depot for chemical substances or fuels. The vehicle according to the invention is hereby widely deployable, wherein the primary power source can be utilized for full power operation where this is allowed and with only the secondary power source where operation has to take place with complete safety.

The electrical power supply of the secondary power source can in principle be embodied in diverse ways. A particular embodiment of the cleaning vehicle according to the invention is characterized in this respect in that the electrical power supply comprises a battery pack carried by the cleaning vehicle. Because of this battery or accumulator pack the vehicle can operate wholly autonomously with the secondary power source. By giving the battery pack a heavier or lighter form a suitable compromise can be reached between operating time on the one hand and space occupied and mass on the other.

A completely unique preferred embodiment of the cleaning vehicle according to the invention has the feature that the electrical power supply comprises a connection to a local electricity network close to the vehicle, in particular a connection to a public electricity network. The vehicle can thus be connected to a local electricity network, in particular a public mains supply, for power supply to the secondary power source therefrom. Not only does this result in an unlimited operating time, there is also a significant saving in fuel costs in those situations in which the second power source is also at least partially in operation.

Use is advantageously made in the cleaning vehicle according to the invention of a modular setup wherein a suction capacity demanded is adapted to a specific operation. With this in mind a further particular embodiment of the cleaning vehicle according to the invention has the feature that the at least one primary pump unit comprises at least a first and a second mechanical pump unit which are coupled via a geared transmission to the primary power source.

A further embodiment of the cleaning vehicle more particularly has the feature here that each of the mechanical pump units receives power in the order of magnitude of between 30 and 40 kW, in particular of about 35 kW. The suction capacity of the vehicle can thus be largely adapted thereto in any situation by enabling a suitable combination of no, one or both primary power sources with optionally the secondary power source. With this in mind a further particular embodiment of the cleaning vehicle according to the invention is characterized in that the geared transmission comprises at least one driven input shaft to which both the primary power source and the secondary power source are coupled, and that the geared transmission comprises at least one driving output shaft to which a drive train of the chassis and the pump device are coupled. The geared transmission can for instance be switched to a desired position from a cab of the driver. In a particular embodiment the drive train of the vehicle can also be coupled here to the secondary power source so that the vehicle can move as a whole in electrically driven manner.

The cleaning vehicle according to the invention is particularly suitable for utilization in an ATEX environment. An important application in this context is the cleaning of chemical plants and storage depots. Allowance always has to be made here for the possible presence of slightly flammable and potentially explosive substances, and any possible ignition source therefore has to be precluded as far as possible. The cleaning vehicle according to the invention can allow for this by making use in such a case of only the secondary electrical power source.

Particularly suitable for such situations is a practical embodiment of the cleaning vehicle according to the invention which is characterized in that the secondary power supply is able and configured to supply to the secondary power source a power in the order of magnitude of between 10 and 50 kW, more particularly between 10 and 30 kW and preferably of about 16.5 kW. This motor power is found in practice to be sufficient on the one hand to effectively remove slurry and the like, while on the other hand, particularly within the latter range, such power can still be supplied from a standard high-voltage or three-phase current connection of a public mains supply and, if derived from a battery pack, moreover provides an efficient operating time. This makes the vehicle exceptionally versatile in use.

In some cases it is necessary to first dislodge surface contamination before it can be suctioned up and removed. For such cases a further particular embodiment of the cleaning vehicle according to the invention provides a solution by being characterized in that the vehicle also comprises a high-pressure installation in addition to the suction installation, which high-pressure installation comprises a high-pressure pump with an electrical power source supplied by the electrical power supply, and more particularly in that the high-pressure pump comprises the secondary power source as source of power.

The structural construction and embodiment of the cleaning vehicle according to the invention can in principle be chosen as desired. A further particular embodiment of the vehicle has in this respect the feature that the chassis comprises at least one of a (self)-propelled chassis and a pulled chassis, in particular a semitrailer or trailer.

Figure 2:
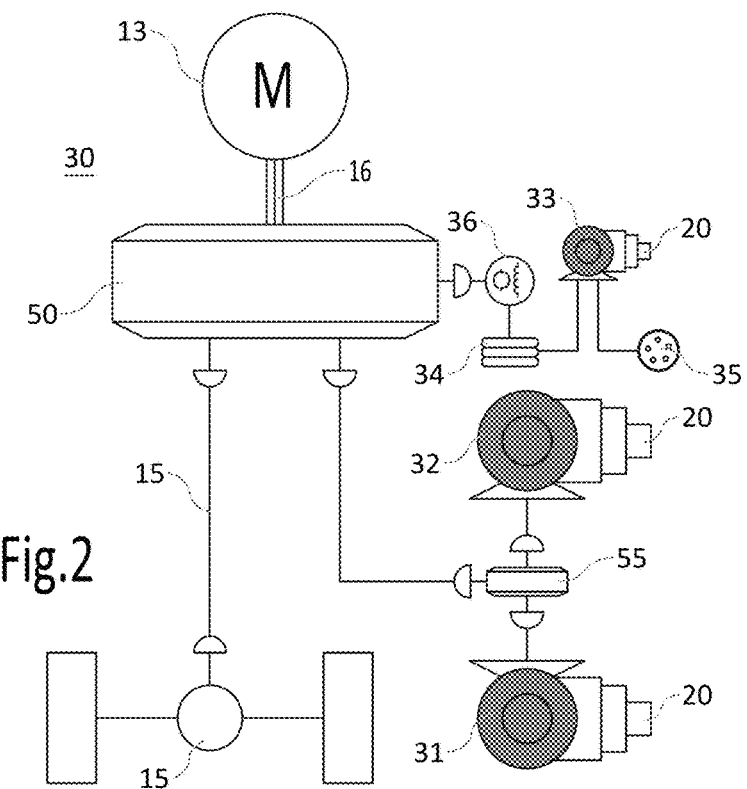

The invention will now be further elucidated on the basis of an embodiment and an accompanying drawing. In the drawing:

FIG. 1 is a side view of an exemplary embodiment of a cleaning vehicle according to the invention; and FIG. 2 shows an operating principle of the motor part of the cleaning vehicle of FIG. 1.

It should be noted here that the figures are purely schematic and not drawn to scale. Some dimensions in particular may be exaggerated to greater or lesser extent for the sake of clarity. Corresponding parts are designated in the figures with the same reference numeral.

FIG. 1 shows schematically an exemplary embodiment of a cleaning vehicle according to the invention. The cleaning vehicle is based on a rolling chassis 10 with a driver's cab 11 having thereunder a conventional combustion engine 13 (not shown in FIG. 1) as primary power source. This is usually a diesel engine, for which purpose the vehicle is fitted with a diesel tank 12 of a sufficient volume. Use can be made for the vehicle of an existing commercially available truck chassis. The combustion engine is coupled to a drive train 15 of the vehicle and provides for an autonomous movement of the vehicle whereby the vehicle can be taken to a destination.

Situated on the chassis is a superstructure which makes the vehicle a cleaning vehicle. This superstructure comprises in the first place an underpressure chamber 20 provided with a suction connection 25 to which a suction conduit can be coupled. In order to maintain an underpressure in the underpressure chamber the vehicle has a suction installation 30 which is in open communication with the underpressure chamber in order to create an underpressure therein. This underpressure is manifested as an airflow via the suction conduit (hose) which is coupled to suction connection 25 and with which dirt can be suctioned up from a surface and carried to the underpressure chamber. A suitable dirt and moisture separator in the underpressure chamber ensures that the removed dirt is collected in the underpressure chamber and, at the end of the operation, carried therein to a suitable (authorized) location or transferred to a separate transport vehicle or a trailer.

In this embodiment the suction installation comprises a primary pump device in the form of a first primary pump unit 31 and a second primary pump unit 32, both of which have a power consumption in the order of between 30 and 40 kW and are driven by the primary power source, i.e. the combustion engine of the vehicle. In addition, the suction installation according to the invention comprises a secondary pump unit 33 which draws its power from an electrical power source. This secondary power source 33 is based on an electric motor with a maximum power of between 10 and 30 kW and draws its power supply from a battery pack 34 accommodated on the vehicle. The above stated maximum power moreover allows the secondary pump unit 33 to be supplied from a local electricity distribution network, in particular a public mains supply. The vehicle has for this purpose a high-voltage current connection 35 with which the vehicle can be coupled to the mains supply at a location for cleaning.

It is possible to draw on this secondary power source wholly independently of the primary power source, so that fully electrical operation can take place using secondary pump unit 33 (electric pump). In the present example electric pump 33 takes a fully EX form, i.e. it complies with the ATEX-96 and ATEX-137 directives. Operation can and may as such take place within an ATEX zone with such an electric pump. Battery pack 34 complies with the same directive and conditions.

Because the combustion engine can be switched off here, the presence of this ignition source is eliminated, whereby the vehicle is suitable to operate under an ATEX regime. Although battery pack 34 inevitably imposes a finite period of operation, the vehicle can operate wholly electrically for a long period once it has been connected to a mains supply 35, wherein a significant operational cost-saving is also realized in that relatively expensive fuel is then not used. In practice the secondary power source 33 of about 16.5 kW applied here is sufficiently powerful to carry out varying ATEX operations wholly independently.

An operating diagram of the suction installation is shown in further detail in FIG. 2. An output shaft of combustion engine 13 is connectable via a first geared transmission 50 (switch (gear) box) to drive train 15 of the vehicle. In addition, both primary pump units 31, 32 are connectable via transmission 50 to combustion engine 13. Provided here between transmission 50 and the two pump units is a second geared transmission 55 (intermediate (gear) box) with which the two pump units can be coupled and switched on individually of each other, one of the two or both at the same time. In this example both pump units 31, 32 have the same power consumption of about 35 kW, so that a suction capacity of 35 kW (individually) or 70 kW (together) can thus be generated. In addition, the suction installation comprises separately of the combustion engine the secondary pump unit 33 with an electric motor of about 16.5 kW. This can be operated wholly autonomously or in combination with one or both primary pump units 31, 32. The following pump regimes can thus be applied:

| Regime: | Pump units enabled: | Power: |
| --- | --- | --- |
| ATEX electrical | only the secondary pump | 16.5 kW |
| electrical | secondary pump powered by the combustion engine | 16.5 kW |
| low power | one primary pump | 35 kW |
| intermediate power | one primary pump and the secondary pump | 51.5 kW |
| high power | both primary pumps | 70 kW |
| maximum power | both primary pumps and the secondary pump | 86.5 kW |

Secondary pump unit 33 is preferably supplied from a fixed (high-voltage or three-phase current) connection 35 from a mains supply, but can optionally also operate for a shorter period on battery pack 34. A generator 36 can optionally also be coupled via the transmission to combustion engine 13, with which generator the battery pack 34 is charged when combustion engine 13 is switched on. Because of the different regimes under which the vehicle can operate, the vehicle described here is particularly versatile and economic in use, wherein only the suction capacity is employed in each case that is required for the relevant operation. Because of the presence of electric pump 33, battery pack 34 and optionally a generator, the vehicle moreover has the unique property that an underpressure can already be generated in tank 20 during travel.

Although the invention has been further elucidated above on the basis of only a single exemplary embodiment, it will be apparent that the invention is by no means limited thereto. On the contrary, many variations and embodiments are still possible within the scope of the invention for a person with ordinary skill in the art.

While use is thus made in the exemplary embodiment of a vehicle having only a combustion engine as primary power source, the vehicle can also be hybrid, wherein the combustion engine and an electric motor serve in tandem as primary power source responsible for the propulsion of the vehicle. This electric motor can here particularly comprise the secondary power source.

In addition to being accommodated on the tractive vehicle itself, the suction installation can moreover be wholly or partially accommodated on a pulled trailer or semitrailer which are then coupled to a tractive vehicle. The battery pack in particular can also be accommodated on a pulled trailer and, in addition to being of fixed form, can also be given a releasable and therefore easily exchangeable form. The operating time on battery supply can hereby also be significantly increased.

It is also possible to equip the vehicle with a high-pressure installation with a clean water and optionally separate dirty water tank to which a high-pressure sprayer can be coupled in order to dislodge contamination from a surface with a water jet under high pressure before it is suctioned up.

The invention claimed is:

1. Cleaning vehicle comprising a rolling chassis and comprising a primary power source which is able and configured to drive the vehicle, which primary power source comprises a combustion engine, wherein a suction installation is provided at least partially fixed to the chassis with an underpressure chamber and a pump device which is coupled thereto and able and configured to create and maintain an underpressure in the underpressure chamber, and wherein the pump device comprises at least one primary pump unit which draws its input power from the primary power source, characterized in that, in addition to the primary pump unit, the pump device comprises at least a secondary pump unit which is driven directly or indirectly by a secondary power source, that the secondary power source comprises at least one electric motor and that the secondary power source is supplied independently of the primary power source by an electrical power supply.

2. Cleaning vehicle as claimed in claim 1, characterized in that the electrical power supply comprises a battery pack carried by the cleaning vehicle.

3. Cleaning vehicle as claimed in claim 1, characterized in that the electrical power supply comprises a connection to a local electricity network close to the vehicle.

4. Cleaning vehicle as claimed in claim 1, characterized in that the at least one primary pump unit comprises at least a first and a second mechanical pump unit which are coupled via a geared transmission to the primary power source.

5. Cleaning vehicle as claimed in claim 4, characterized in that each of the mechanical pump units receives power in the order of magnitude of between 30 and 40 kW.

6. Cleaning vehicle as claimed in claim 4, characterized in that the geared transmission comprises at least one driven input shaft to which both the primary power source and the secondary power source are coupled, and that the geared transmission comprises at least one driving output shaft to which a drive train of the chassis and the pump device are coupled.

7. Cleaning vehicle as claimed in claim 4, characterized in that each of the mechanical pump units receives power in the order of magnitude of about 35 kW.

8. Cleaning vehicle as claimed in claim 1, characterized in that the secondary power supply is able and configured to supply to the secondary power source a power in the order of magnitude of between 10 and 50 kW.

9. Cleaning vehicle as claimed claim 8, characterized in that the secondary power supply is able and configured to supply to the secondary power source a power in the order of magnitude of between 10 and 30 kW.

10. Cleaning vehicle as claimed claim 9, characterized in that the secondary power supply is able and configured to supply to the secondary power source a power in the order of magnitude of about 16.5 kW.

11. Cleaning vehicle as claimed in claim 1, characterized in that the vehicle also comprises a high-pressure installation in addition to the suction installation, which high-pressure installation comprises a high-pressure pump with an electrical power source supplied by the electrical power supply.

12. Cleaning vehicle as claimed in claim 11, characterized in that the high-pressure pump comprises the secondary power source as source of power.

13. Cleaning vehicle as claimed in claim 1, characterized in that the chassis comprises at least one of a (self-)propelled chassis and a pulled chassis.

14. Cleaning vehicle as claimed in claim 13, characterized in that the chassis comprises a semitrailer or trailer.

15. Cleaning vehicle as claimed in claim 1, characterized in that the electrical power supply comprises a connection to a public electricity network.

\* \* \* \* \*